United States Patent
Rossmann et al.

(10) Patent No.: US 6,594,573 B1
(45) Date of Patent: Jul. 15, 2003

(54) METHOD FOR REGULATING A CLUTCH OR A BRAKE IN A TRANSMISSION

(75) Inventors: Thomas Rossmann, Utting am Ammersee (DE); Friedrich Tenbrock, Langenargen (DE); Dieter Neumann, Neukirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/070,547

(22) PCT Filed: Sep. 2, 2000

(86) PCT No.: PCT/EP00/08576
§ 371 (c)(1),
(2), (4) Date: Feb. 28, 2002

(87) PCT Pub. No.: WO01/20200
PCT Pub. Date: Mar. 22, 2001

(30) Foreign Application Priority Data

Sep. 10, 1999 (DE) .......................................... 199 43 334

(51) Int. Cl.⁷ ............................................... G06F 17/00
(52) U.S. Cl. ........................... 701/67; 701/51; 701/60; 701/78; 477/62; 477/71; 477/166
(58) Field of Search ............................. 701/51, 60, 67, 701/78; 477/62, 70, 71, 166

(56) References Cited

U.S. PATENT DOCUMENTS

| | | | |
|---|---|---|---|
| 5,150,297 A | * | 9/1992 | Daubenmier et al. ......... 701/66 |
| 5,527,238 A | | 6/1996 | Hrovat et al. ................ 477/166 |
| 5,719,768 A | | 2/1998 | Tashiro et al. ................. 701/51 |
| 5,752,210 A | | 5/1998 | Kato et al. ..................... 701/51 |
| 6,424,901 B1 | * | 7/2002 | Vorndran et al. ............. 701/51 |

FOREIGN PATENT DOCUMENTS

DE 195 20 579 A1 12/1995 ........... B60K/41/00

OTHER PUBLICATIONS

Gruhle, Dr.–Ing. W.–D., Dr.–Ing. F. Hauch VDI, Dr.–Ing. T. Knapp and Dr.–Ing. C. Rüchardt, "Modellgestützle Applikation einer 'Geregelten Wanderüberbrückungskupplung' in Pkw–Automatgetrieben", VDI *Berichte*, Nr. 1175, 1995, pp. 265–279.

* cited by examiner

*Primary Examiner*—Gertrude Arthur
(74) *Attorney, Agent, or Firm*—Davis & Bujold, P.L.L.C.

(57) ABSTRACT

The invention relates to a method for regulating an electro-hydraulically controlled clutch or a brake of a transmission. According to the invention, the clutch or brake is regulated using a model-based compensation pressure regulator with the help of an observation unit, whereby the compensation-pressure control circuit contains a non-linear compensation element which corresponds to the inverse model of the control system of the coupling or brake. The observation unit estimates interference levels of the clutch regulation from a drive chain model, according to a condition-estimation procedure.

13 Claims, 5 Drawing Sheets

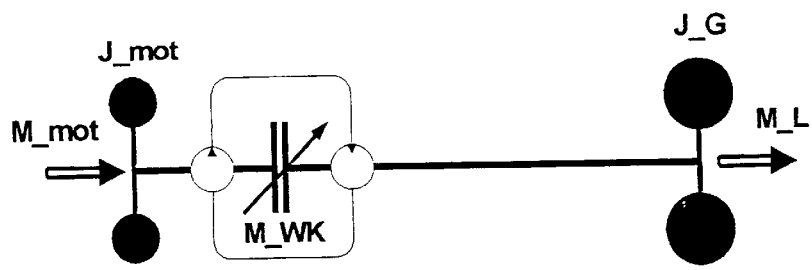
Fig. 3-1
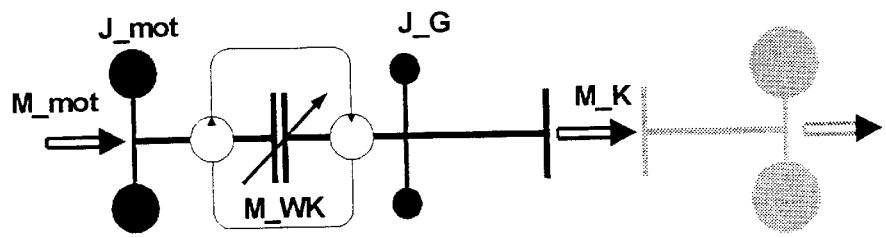
Fig. 3-2
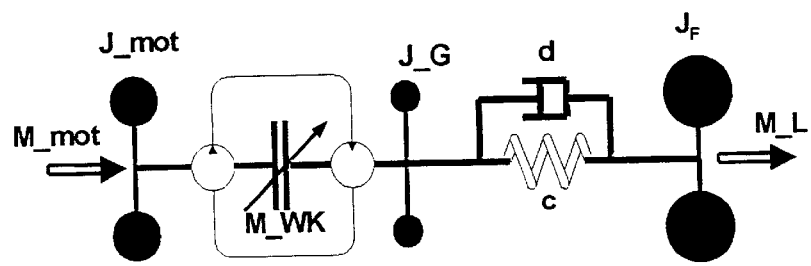
Fig. 3-3
Fig. 3

$$\underbrace{\begin{pmatrix} \dot{M}\_S \\ \dot{M}\_K \\ \ddot{p}\_WK \\ \dot{p}\_WK \\ \dot{\omega}\_d \\ \dot{\omega}\_t \end{pmatrix}}_{\dot{x}} = \underbrace{\begin{pmatrix} 0 & 0 & 0 & 0 & \frac{J\_d}{J\_G} & 0 & 0 \\ 0 & 0 & 0 & \frac{1}{J\_G} & \frac{-1}{J\_G} & 0 & 0 \\ 0 & 0 & \frac{-2*D}{T} & \frac{-1}{T^{**}2} & 0 & 0 \\ 0 & 0 & 1 & 0 & 0 & 0 \\ 0 & 0 & 0 & \frac{-\mu\_geo}{J\_d} & 0 & 0 \\ 0 & 0 & 0 & \frac{\mu\_geo}{J\_G} & 0 & 0 \end{pmatrix}}_{A} * \underbrace{\begin{pmatrix} M\_S \\ M\_K \\ \dot{p}\_WK \\ p\_WK \\ \omega\_d \\ \omega\_t \end{pmatrix}}_{x} + \underbrace{\begin{pmatrix} \frac{1}{J\_mot} & \frac{-1}{J\_mot} & 0 & 0 & 0 & 0 \\ 0 & 0 & \frac{-1}{J\_G} & \frac{1}{J\_G} & 0 & 0 \\ 0 & 0 & 0 & 0 & 0 & \frac{1}{T^{**}2} \\ 0 & 0 & 0 & 0 & 0 & 0 \\ 0 & 0 & \frac{1}{J\_G} & \frac{k\_L}{J\_G} & \frac{\mu\_geo}{J\_d} & 0 \\ 0 & 0 & \frac{-1}{J\_G} & \frac{-k\_L}{J\_G} & \frac{-\mu\_geo}{J\_G} & 0 \end{pmatrix}}_{B} * \underbrace{\begin{pmatrix} M\_mot \\ M\_p \\ M\_t \\ M\_L \\ p\_0 \\ p\_soll \end{pmatrix}}_{u}$$

Fig. 5

METHOD FOR REGULATING A CLUTCH OR A BRAKE IN A TRANSMISSION

FIELD OF THE INVENTION

The invention relates to a method for regulating a clutch or a brake in an electrohydraulically controlled transmission.

BACKGROUND OF THE INVENTION

An automatic transmission for a motor vehicle usually has several clutches and brakes with which different gear steps and the direction of travel can be shifted. In such automatic transmissions there is customarily used as starting element a hydrodynamic torque converter which, to optimize the total efficiency of the transmission, is provided with a converter lock-up clutch which in certain gear steps is partly or totally closed depending on rotational speed and load of the driven engine.

There are known also special wet operating starting clutches which can also be integrated in the automatic transmission. But those starting clutches are mostly situated as unit on the transmission input, for ex., also as starting element in an automatic continuously variable transmission. The wet starting clutch is also disposed as unit on the transmission output, specially in CVT transmissions (continuously variable transmissions).

The clutches and brakes in the automatic transmission or in the automated continuously variable transmission are usually electrohydraulically controlled independently of the application of the shifting element as gear-change clutch, starting clutch, or converter lock-up clutch. For this purpose variables according to specifics of the vehicle, specifics of the transmission and driving mode such as axle and gear ratios, transmission oil temperature, engine torque, engine rotational speed, vehicle speed, internal rotational speeds of the transmission, accelerator pedal position and accelerator pedal change, brake signal, vehicle acceleration, tractional resistance and driver activity are processed in an electronic transmission control unit and corresponding output signals relevant to the clutch, for ex., for pressure control or pressure regulation, or during a gear change or for rotational speed regulation during a slip operation, are transmitted to a hydraulic control unit and there converted by means of actuators and hydraulic valves into hydraulic pressure for the corresponding clutch.

Gruhle, Jauch, Knapp and Ruchardt describe as effective example in VDI Reports No. 1175, 1995, a method for model-supported application of a regulated converter lock-up clutch in automatic transmissions of passenger cars. The converter lock-up clutch and the control thereof are at present a sub-system in the automatic transmission which decisively imprint the driveability of a vehicle. To meet the increasing requirements in comfort, driving performance and fuel consumption, here is proposed a complex control draft of the converter clutch provided with a control loop which works with the differential rotational speed from engine and turbine rotational speeds. To stabilize and increase the dynamics of the control loop, there are implemented in addition a load modulation of the engine torque and special functions with direct pressure standards for the converter lock-up clutch.

In its basic structure the control draft described by way of example is applicable to all electrohydraulically actuated clutches and brakes in transmissions of passenger cars and is not confined to the case of the converter lock-up clutch. But disadvantages in such a complex control draft are the basic structure of the software of the electronic transmission control which is vague due to added functionalities and can be extended only at great expense, and the considerable cost for application of such functions.

Therefore, the problem on which this invention is based is, departing from the cited prior art, further to develop with regard to improved control quality and control dynamics and reduced application cost, a method for regulating a clutch or brake designed for ex., as gear clutch, starting clutch or converter lock-up clutch.

According to the invention this problem is solved by the features of claim 1. Other developments of the invention result from the sub-claims.

SUMMARY OF THE INVENTION

The invention accordingly proposes to design the clutch regulation with a model-based compensation pressure regulator using an observation unit of interference level which, based on a drive train model, estimates interference levels of the clutch regulation according to a condition-estimation method. The interference levels reproduce the inaccuracies in comparison with the real system of the physical mathematical model used according to regulation technology and result, specially from characteristic line errors determined by principle, in stationary and dynamic control errors, hydraulic tolerances, the same as dynamic model errors determined by principle.

Therefore, the observation unit estimates from the drive train model the interference torque on the clutch or brake to be shifted or regulated and the load torque cropping up in power flow direction behind the clutch or brake. According to the configuration of the drive train model, the characteristic shape of the torsional oscillations of the drive train can also be estimated.

The inventive method is based on a non-linear compensation method according to the principle of exact linearization. From the linkage of a hydraulics model of the clutch control with an inverse model of the control system, a simple transmission function results. The remaining system can be drafted by control technology according to the linear theory specially by a separation of the non-linear portion of the observation unit.

By such a regulation draft of the clutch constructed as compensation pressure control loop supported by observation unit, there are obtained specially advantageously an operating-point dependent, uniform control behavior of the closed control loop with high adjusting dynamics resulting therefrom and a strong sequence and interference behavior.

In a first development of the invention it is proposed to design the interference-level observation unit as reduced observation unit which estimates only the unknown system variables relevant for the clutch regulation. Hereby is advantageously obtained as high as possible a computer speed and therewith as high as possible regulator dynamics.

In a second development of the invention it is proposed to design the interference-level observation unit as complete observation unit which estimates all system variables. Hereby can be advantageously improved in particular a servo-control quality for the regulator and therewith the quality of the regulator.

In a third development of the invention it is proposed to design the interference-level observation unit as Kalman filter which is advantageously sturdy in relation to signal rustles.

In another development of the invention it is proposed to design as several linked regulation blocks the regulator of the closed, model-based and observation-unit supported compensation pressure control loop. A first block processes as rotational speed regulator the rotational speeds and slip standards of the clutch regulation. The rotational speed regulator advantageously does not need to contain components for ensuring stationary precisions and can be designed as simple P regulator. A consecutive second block calculates from the theoretical standards of the rotational speed regulations, from the servo-control values of the inverse system model and from estimated interference levels of the observation unit, a pressure standard for the hydraulic servo component of the clutch control. The conversion independent of the operating point of the regulated quantity is advantageous here. A consecutive third block compensates as pressure regulator the tolerances of the hydraulic servo component with the aid of estimated variables of the observation unit and delivers a theoretical pressure for the clutch control. By the compensation of the technical pressure fluctuations of customary pressure adjusters in the whole operating range, the dynamics of the control loop is clearly improved. A consecutive fourth block works as traditional pressure-current regulator and converts the theoretical pressure standard into a current standard for the electrohydraulic pressure adjuster.

In one other development of the invention it is proposed to design the rotational speed regulator of the closed, model-based and observation-unit supported compensation pressure control loop as PD regulator with additional non-linear term. In case of great divergences from a theoretical value, a quicker approximation to the theoretical value is hereby achieved.

In another development of the invention it is proposed to design the pressure regulator of the closed, model-based and observation-unit supported compensation pressure control loop as regulator with PT2 characteristic according to the principle of exact linearization. The dynamics of the control loop can be advantageously influenced hereby.

The inventive regulation draft at the same time can be universally used for every electrohydraulically controlled clutch. Cases of application are, for ex., a wet starting clutch in an automatic transmission or in an automated manual transmission without or with stand-by control SBC, a selector clutch or selector brake in an automatic transmission or a converter lock-up clutch in an automated transmission.

BRIEF DESCRIPTION OF THE DRAWINGS

The invention is explained in detail herebelow with reference to drawings based on the example of a converter lock-up clutch. In the drawing:

FIG. 3 is a diagrammatic representation of three drive train models as FIG. 3-1, FIG. 3-2 and FIG. 3-3, FIG. 4 shows by way of example an inventive compensation pressure control loop with an observation unit of interference level and FIG. 5 shows a differential equation system for an observation unit of interference level designed by way of example.

DETAILED DESCRIPTION OF THE INVENTION

As fundamental in every clutch, the pressure differential on the piston of the converter lock-up clutch (WK) determines the torque transmissible by the clutch. Assuming that the pressure portions generated by the rotation are of equal magnitude on both sides of the clutch, the supply pressure of the WK piston determines alone the torque transmissible with the WK $$M\_WK = A\_piston * r\_piston * z * \mu * p\_WK$$

with

| $A\_piston$ | surface of the WK piston |
|---|---|
| $R\_piston$ | central friction lining radius |
| $z$ | number of friction surfaces |
| $\mu$ | friction value = f |
| | (temperature, differential rotational speed, lining compression) |
| $p\_WK$ | supply pressure to the WK piston. |

The geometric variables and the friction value can be combined in one variable $\mu\_geo$ there resulting for the torque transmissible with the WK:

$$M\_WK = \mu\_geo * p\_WK.$$

Diverging from the ideal behavior of the clutch, the following effects can now be observed:

In case of differential rotational speeds unequal to zero, torque is transmitted parallel to the WK via the hydraulic control loop of the converter. The current in the loop also affects the space between the turbine wheel and the WK piston.

The friction linings are grooved to cool the friction surfaces. The oil flowing through the grooves leads a large part of the generated heat directly away from the generation point. The radial current between piston and lid forms a more or less strongly defined whirl which changes the pressure between housing and WK piston.

Depending on the length and cross section of the recoil pipe and of the flow rate, a back pressure generates. When said effects are taken into account, the torque equation reads:

$$M\_WK = \mu\_geo * (p\_WK - p\_0)$$

with p_0 pressure offset=f (engine rotational speed, through flow).

$\mu$ and $\mu\_geo$ respectively and p_0 cannot be calculated with enough accuracy. The values are determined by measurements and integrated into characteristic fields in the model. The torque absorption and delivery of the torque converter are taken into consideration in the model with two characteristic lines which describe the stationary behavior as function of the rotational speed ratio of turbine rotational speed to engine rotational speed:

| $M\_p2000 = f(v)$ | pump absorption torque at engine rotational spend $n\_mot = 2000$ 1/min |
|---|---|
| $\mu\_WV = f(v)$ | converter reinforcement |
| $v = n\_t/n\_mot$ | rotational speed ratio of turbine rotational speed to engine rotational speed |

With said characteristic lines it is possible for each operating state to calculate the pump torque M_P and the turbine torque M_T of the torque converter to $$M\_p = M\_p2000(v) * n\_mot2 / (2000\ 1/min)2 \text{ and}$$

$$M\_t = \mu\_WV(v) * M\_p.$$

Figure 1:
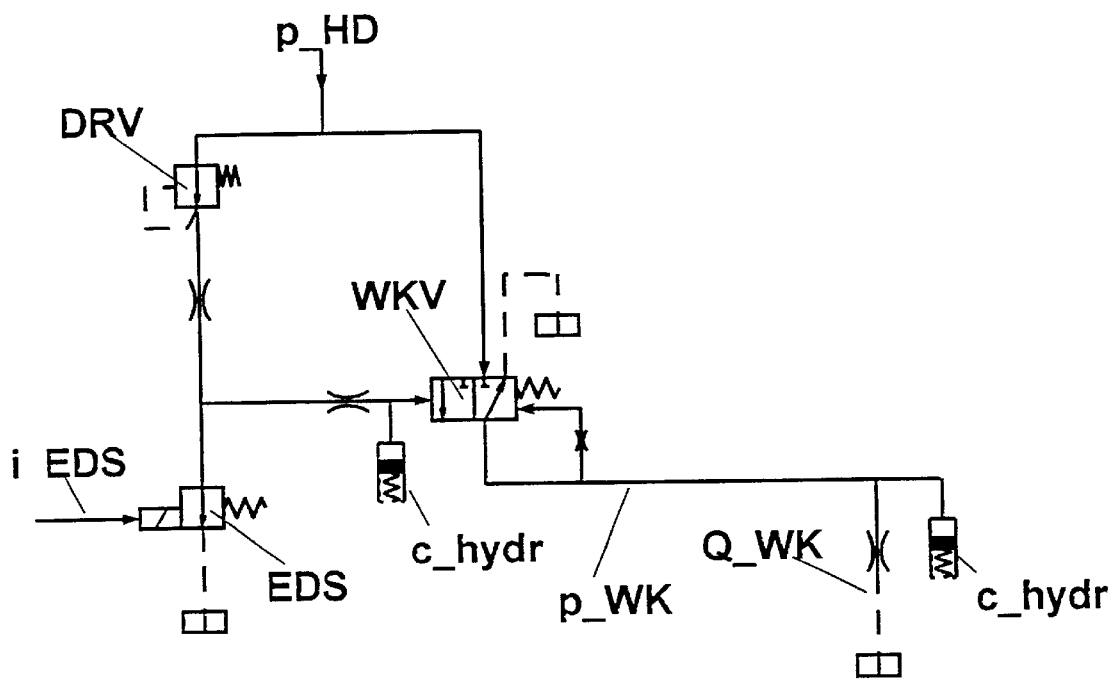
FIG. 1 is a diagrammatic representation of a simplified hydraulic control of a converter lock-up clutch.

FIG. 1 shows now a diagrammatic representation of an extensively simplified hydraulic control of a converter lock-up clutch. With MKV is designated a converter clutch valve through which the piston of the converter lock-up clutch WK is loaded for torque transmission with pressure p_WK. The WK usually has a certain oil through flow Q_WK, for ex., for cooling the lining in the permanent slip state. This WK through flow is shown in FIG. 1 simplified by a diaphragm. A system pressure p_HD is first reduced via constant pressure regulating valve DRV to a pressure le l tuned to the type of the electric pressure adjuster EDS, for ex., an electrohydraulic pressure regulator or an electrohydraulic cycle valve. The EDS is loaded by the electronic transmission control with a control current i_EDS whereby the converter clutch valve WKV, which is designed, for ex., an analog valve, is loaded with a control pressure and releases the pressure line from the system pressure p_HD to the piston of the converter lock-up clutch. The converter clutch valve WKV adjusts here a pressure p_WK tuned to the converter type and to the torque to be transmitted. The hydraulic elasticities c_hydr are plotted for further clarification of the influences acting upon the control system.

The non-linear stationary transmission behavior of the converter clutch pressure p_WK=f (i_EDS) produced by the pressure adjuster EDS is shown as characteristic line according to control technology in the model. The dynamic simulation of the system generates a non-linear behavior of $2^{nd}$ order which according to the analysis of the frequency responses can be described with the following model equation $$T(0, p\_WK)^{**}2^*p\_WK+2^*D(0, p\_WK)^*T(0, p\_WK)\dot{p}\_WK+p\_=p\_\text{soll}$$

with

| | |
|---|---|
| T(0,p_K) | time constant as characteristic field according to transmission temperature θ and pressure p_WK, |
| D(0,p_wk) | damping as characteristic field according to transmission temperature θ and pressure p_WK. |

Figure 2:
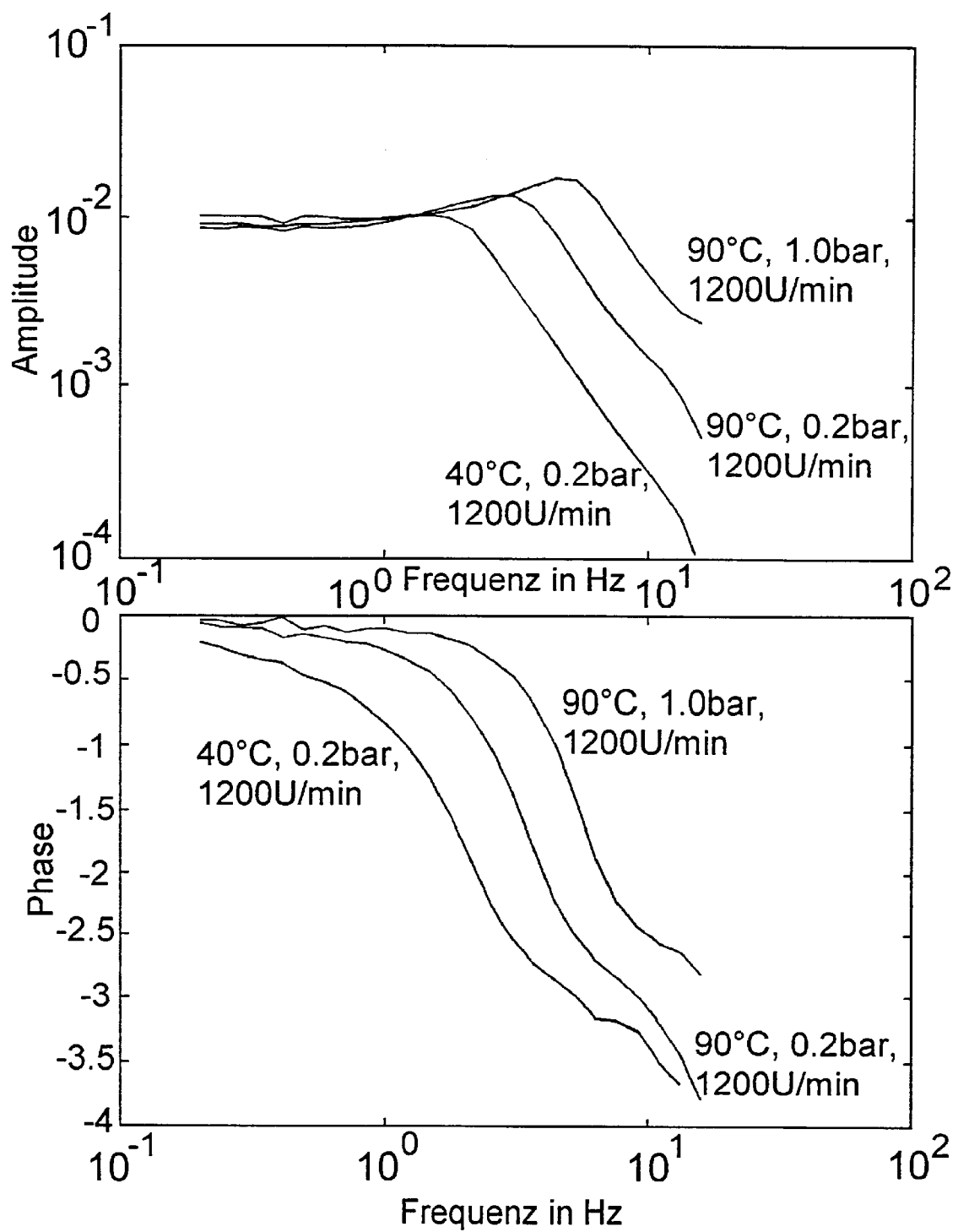
FIG. 2 shows by way of example identification by measure technology of the model equation for the non-linear transmission behavior $p\_WK = f(i\_EDS)$.

FIG. 2 shows by way of example an identification according to measuring technology of the model equation for the transmission behavior p_WK=f(i_EDS). A variation is shown of the time constant and losses depending on the temperature and on the pressure with reference to the frequency responses and phase responses.

The mathematical description of the non-linear transmission behavior of the converter can obviously be improved by detailed physical mathematical models which can simplify the identification by test technology of the individual equation parameters.

In FIG. 3 are reproduced by way of example three simplified torque-volume models of the drive train of the vehicle. On account of the changing inertia torques in the transmission, the models are described according to gear and gear shift. FIG. 3-1 shows a simple model for a fixed gear step that can be described with two differential equations:

$$J\_mot^*\dot{\omega}\_mot=M\_mot-M\_p-M\_WK$$

$$J\_G^*\dot{\omega}\_t=M\_t+M\_WK-M\_L$$

with

| | |
|---|---|
| M_mot | torque produced by the engine reduced by all losses (friciton, added auxiliary aggregates including transmission pump), |
| M_p, M_t | pump and turbine torque of the hydraulic loop of the converter, |
| M_WK | torque on the converter lock-up clutch, |
| M_L | load torque from tractional resistance on the output, |
| J_mot | engine inertia torque (including primary side of the converter), |
| J_G | gear-dependent substitute inertia torque (contains secondary side of the converter, all rotating parts of the transmission, universal shaft, differential gear, axle shafts, wheels and vehicle mass; respectively reduced to the turbine rotational speed n_t), |
| ω_mot | angular velocity of the engine, |
| ω_t | angular velocity of the converter turbine. |

In FIG. 3-2 is shown a second model for a drive train which takes into account a gear shift, that is, quitting the synchronous rotational speed of the old gear till reaching the synchronous rotational speed of the new gear. The model can be described by the equations:

$$J\_mot^*\dot{\omega}\_mot=M\_mot-M\_p-M\_WK$$

$$J\_G^*\dot{\omega}\_t=M\_t+M\_WK-M\_K+(k\_L^*M\_L)$$

| | |
|---|---|
| M_mot | torque produced by engine, reduced by all losses (friction, added auxiliary aggregates including transmission pump), |
| M - p, M_t | pump and turbine torque of the hydraulic loop of the converter, |
| M_WK | torque on the converter lock-up clutch, |
| J_mot | engine inertia torque (including primary side of the converter), |
| J_G | shift-dependent inertia torque of the transmission (containing all rotatory parts between WK and gear clutch; reduced to the turbine rotational speed n_t), |
| M_K | torque on the gear clutch, |
| (k_L*M_L) | portion of the load torque from kinematic coupling via the planetary gear set, |
| ω_mot | angular velocity of the engine, |
| ω_t | angular velocity of the converter turbine. |

Simulation and tests in the vehicle have shown that the simple drive train model of FIG. 3-1 is no longer adequate for large total ratios (that is, for low gears), since it disregards the first vibration characteristic form of the drive train. The spring rigidities of the axle shafts are determinant here. In FIG. 3-3 is shown by way of example a model that takes into account the spring rigidities of torsional vibrations and damping of torsional vibrations of the drive train. The number of differential equations increases here to three:

$$J\_mot^*\dot{\omega}\_mot=M\_mot-M\_p-M\_WK$$

$$J\_G^*\dot{\omega}\_t=M\_t+M\_WK-M\_spring$$

$$J\_F^*\dot{\omega}\_ab=M\_spring-M\_L$$

with $$M\_spring=c^*(\int\omega\_tdt-\int\omega\_abdt)+d^*(\omega\_t-\omega\_ab)$$

and

| | |
|---|---|
| M_mot | torque produced by the engine reduced by all losses (friciton, added auxiliary aggregates including transmission pump), |
| M_p, M_t | pump and turbine torque of the hydraulic loop of the converter, |

-continued

| | |
|---|---|
| M_WK | torque corresponding to the deflection and deflection velocity of the axle shafts, |
| M_spring | torque corresponding to the deflection and deflection velocity of the axle shafts, |
| M_L | load torque from tractional resistance on the output, |
| J_mot | inertia torque of the engine (including primary side of the converter), |
| J_G | gear-dependent inertia torque of transmission and output drive train (contains all rotating parts between WK and shift clutch |
| J_F | axle shafts, reduced to the turbine rotational speed n_t), gear-dependent inertia torque of the vehicle (contains wheels and vehicle mass reduced to turbine rotational speed n_t) |
| ω_mot | angular velocity of the engine, |
| ω_t | angular velocity of the converter turbine |
| ω_ab | angular velocity of the output. |

Other more complex mathematical drive train models can obviously be shown, for ex., the model of FIG. 3-2 can be extended by the influences of the torsional elasticities similarly to the arrangement of the model of FIG. 3-3.

According to the invention, with the aid of the system information described above by way of example, a model-based regulation is now devised which makes available the desired functionality without it being necessary in certain operating situations to refer to special functions. High dynamics of the closed control loop are implemented, the regulation divergences remaining therefore sufficiently small in all cases during high dynamic procedures. Besides, the regulation is here so strong that the control quality, despite the technically unavoidable scattering of parts of all components contained in the control loop and the system changes occurring in the course of the transmission life, is always maintained.

The requirement of greater strength represents in a certain manner a contradiction to the requirement of high dynamics, since great circuit reinforcements generally lead to a reduction of the stability reserves. The contradiction according to the invention is solved by a precise compensation and servo-control of all known influences and the regulator thus becomes extensively released. The other advantages of the inventive regulation are the easier applicability by parameters mostly physically interpretable and the reduction of the parameters by about 50% compared to the known function.

Figure 4:
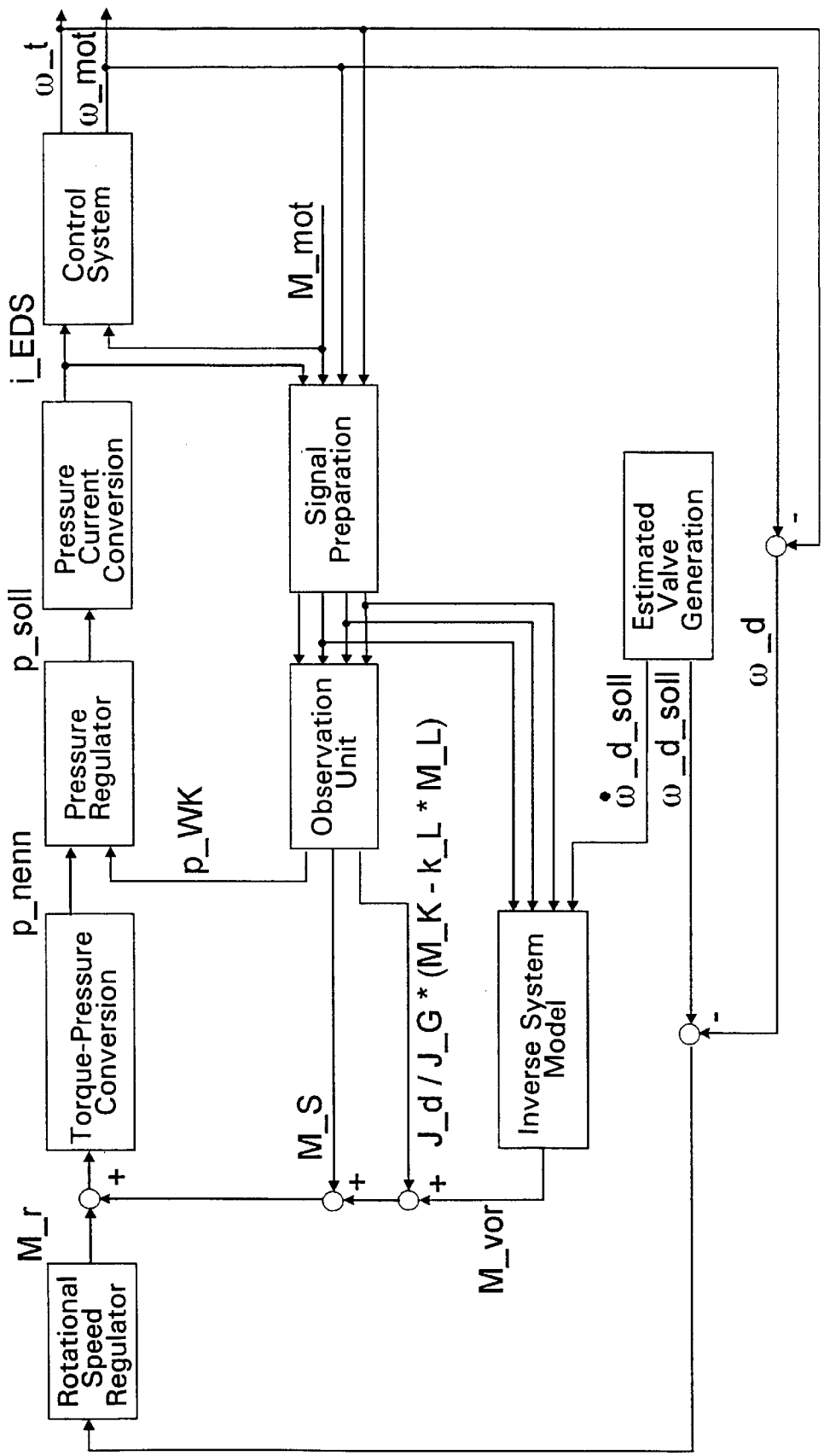

FIG. 4 shows a designed example of an inventive control system for clutch regulation with model-based compensation pressure control loop with the aid of an observation unit of interference level which from the drive train model estimates the interference levels of the clutch regulation according to a condition estimation method. The block diagram of the control loop consists of the blocks "signal preparation", "estimated value generation", "inverse system model", "observation unit", "rotational speed regulator", "torque-pressure conversion", "pressure regulator", "pressure-current conversion" and "control system". Both the "inverse system model" and the "observation unit" underlie here the above described model equations.

The "inverse system model" compensates, with the aid of the measured rotational speeds and of the engine torque made available by the electronic engine control of the drive engine or detected by measure technology, all known torques acting upon the system. A corresponding servo-control torque M_vor can be described by the equation $$M\_vor = \frac{J\_d}{J\_mot} * M\_mot - \frac{J\_d}{J\_mot} * M\_p - \frac{J\_d}{J\_G} * M\_t - J * \omega\_d\_soll$$

The rotary torques are now advantageously related to the differential angular velocity of the converter lock-up clutch to be regulated. J_D is here the inertia torque resulting from the differential angular velocity. For a full compensation are also needed the load torque M_L abutting on the output and determined by tractional resistance, the same as in gear shifts the torques of the clutch to be engaged and disengaged. Said torques can be combined in one total shift torque M_K. If load torque M_L and total shift torque M)K are in addition modulated in adequate manner, the system is in a balanced state of stable limit independently of the actual operating point. But this statement applies only to stationary operating states due to the delays introduced by the hydraulic system.

Since the physical mathematical system model cannot fully reproduce the behavior of the real complex system, according to the invention there is introduced in the model equations an interference torque M_S where are combined the differences between model and reality. On account of the relatively great uncertainties of the parameters in the converter clutch observed by way of example, said interference is taken into account as added clutch torque in the compensation control loop presented by way of example. But his constitutes no limitation for a full compensation, since therewith can always be estimated in connection with the likewise unknown load or shift torques a combination of torques which can cover all conceivable divergences.

Particularly in order to reduce the estimation errors in dynamic procedures, all the pressure acting upon the clutch piston, that is, the nominal friction torques of the clutch, must be known. Since they generally are not shown, there is used according to the invention a combined observation unit of state and interference which reconstructs the clutch pressure p_WK, load torque M_L and interference torque M_S on the basis of the rotational speeds measured. During gear shifts the torques of the shift clutch M_K are observed instead of the load torque M_L. In the example shown, the load torque M)_L is assumed as constant for the time period of the gear shift, in another embodiment of the compensation control loop a variable load moment can also be processed according to control technology.

In order to keep low the costs and at the same time increase the performance capacity of the estimation method, it is proposed according to the invention to estimate by observation unit only the unknown variables, that is, to refer to the draft of a reduced observation unit. The differential equation system for an observation unit thus designed for estimating the interference levels during a gear shift according to the drive train model of FIG. 3-2 is indicated as matrix in FIG. 5. The differential equation system of the reduced observation unit can therefore be represented as vector equation in the form $$\dot{x} = A*x + B*u.$$

Outside the gear shifts, the shift torque M_K is replaced in the state vector by the load torque M_L which then drops out from the vector of the regulated quantity. When the system matrix A shown in FIG. 5 is divided in four parts A11, A12=0, A21 and A22, the same as when the set matrix B shown in FIG. 5 is correspondingly divided in two parts B1 and B2, there results the mathematical form needed for a reduced observation unit draft. The matrix A11 comprises here the square sub-matrix by virtue of which the variables to be observed retro act upon themselves. The assumptions M__S=const and M__K=const apply to stationary operating conditions at least for the unknown torques in the dynamic model. The differential equation system of the reduced observation unit has thus the simplified mathematical form Herein $y=((\omega\_d\omega\_t)^{}T$ describes the vector of the measured parameters while from the vector of the measured variables and from the equation $$p=(M\_S\ M\_K\ dp\_WK/dt\ p\_WK)^{}T-L^*y$$

the variables to be observed can be reconstructed with the aid of the parameters measured. The matrix L of the observation unit determines the characteristic values of the observation unit. With only two free draft parameters l1 and l2, for ex., an observation unit matrix $$L = \begin{pmatrix} \frac{J\_G*J-d}{J\_G+J\_d}*l1 & \frac{J\_G*J\_d}{J\_G+J-d}*l1 \\ -J\_mot*l2 & -(J\_mot+J\_G*l2) \\ 0 & 0 \\ 0 & 0 \end{pmatrix}$$

can be selected for the state estimation. This form advantageously results in that the estimated clutch pressure p__WK is independent of measurements depending only on the regulated quantity p__soll. It could be demonstrated that this sub-system of the compensation pressure control loop it itself stable according to control technology and therefore errors of estimation die away with the characteristic dynamics of the hydraulic system.

The advantages of this inventive generation of the interference-level observation unit are a clear reduction of the computer expenses and a better interpretability of the total system behavior of the clutch observed.

Another essential advantage results from the separation of the non-linear portion of the observation unit, namely, the time constant $T=f(\theta,p\_WK)$ dependent on the transmission oil temperature $\theta$ and on the clutch pressure p__WK and the damping $D=f(\theta,p\_WK)$ likewise dependent on the transmission oil temperature $\theta$ and on the clutch pressure p__WK. The draft of the rest of the system according to control technology can thus result according to the linear theory.

The limitation to only two draft parameters l1 and l2 in the matrix of the observation unit leads to an easier manipulation in the application in the vehicle. In the above indicated form said two parameters directly correspond to the inverse values of the time constants of the remaining linear system. Besides, the system, in the closed control loop, is strong with regard to errors in the hydraulics model when the estimated pressure does not act directly upon the shift torque which physically conditioned possesses high dynamics and hence has to be quicker determined then the remaining unknown variables.

In a development of the invention it is proposed to design the interference-level observation unit so that all system variables be estimated. Hereby can advantageously be further improved in particular the servo-control quality of the regulator and thus ultimately the control quality.

In another development of the invention it is proposed to design the interference-level observation unit as Kalman filter, the advantages of which have been mentioned above.

By the formerly described control parts "inverse system model" and "observation unit" of the inventively designed compensation pressure-regulating control loop according to FIG. 4, the system is converted to a form in which each operating point can be used as stationary balance point according to control technology. This also naturally applies to the theoretic value. The function of the block "rotational speed regulator" shown in FIG. 4 now consists in that in case of divergence from the theoretic value, the differential rotational speed again approximates it. But because of the above described inventive steps, this rotational speed regulator does not have to contain special components to ensure a stationary precision. In the simplest case the rotational speed regulator can therefore be designed as P regulator. Advantageous for increasing the dynamics is a substantially more complex PD regulator having an added non-linear term which in case of gear divergences makes possible a quicker approximation to the theoretic value and at the same time influences only slightly the behavior in the proximity of the estimated value. In a PD rotational speed regulator thus designed, the non-linear control model finds its reproduction in the control law for the control torque M__r of the clutch to be regulated $$M\_r=k\_P^*(\Delta\omega\_d+k\_NL^*|\Delta\omega_d|^*\Delta\omega\_d)+k\_D^*\Delta\dot{\omega}\_d$$

with $$\Delta\omega\_d=\omega\__{d\_}soll-\omega\_d,$$

the proportional regulating parameters k__P, the non-linear regulator parameter k__NL and the differential regulating parameter k__D.

The individual parameters of the rotational speed regulator can be calculated, for ex., by the known method of Gain scheduling. To this end the system is linearize by the theoretic value, taking into account the other control parts, according to the system of parameters and state variables, a set of control parameters being determined for each operating point so that the characteristic values of the closed control loop be approximately independent of the actual state of the system. In order to reduce here dependencies on other variables of the regulator coefficients, it is proposed in the inventive embodiment shown in FIG. 4 to introduce in the control loop the blocks "torque-pressure conversion", "pressure regulator" and "pressure-current conversion".

The block "torque-pressure conversion" calculates form the estimated torque(M__r+M__S+J__d/J__G*(M__K−k__L*M__L)) a theoretic pressure P__nenn for the converter clutch. In this conversion enter in the first place the friction value of the clutch lining and a pressure offset which both depend mainly on the transmission oil temperature and the engine rotational speed. Hereby is ensured a conversion of the regulated quantity dependent on operating point.

The sub-system that follows in the block diagram is the "pressure regulator". An essential importance is attached to this since the system behavior is decisively influenced by the dynamics of the hydraulic adjusting system. As described above, the dynamics of the adjusting element essentially depends to the pressure level itself and on the temperature of the transmission oi. The actually existing fluctuations of customary adjusting elements are so great in quantity that they cannot be disregarded (usual angular frequencies vary from far above 0.1 s to 0.02 s ). Specially in cold operating conditions, the dynamics of the adjusting system itself is too low to meet the requirements set on the regulation with regard to speed. Therefore, the function of the block pressure regulator is to balance the tolerances of the hydraulics adjusting system with the aid of the clutch pressure estimated by the observation unit. The invention proposes to this end a regulator with PT2 characteristic drafted according to the principle of exact linearization with a control law:

$$p\_soll = \left(\frac{T}{T\_dr}\right)^2 (p\_nenn - p\_WK) +$$

$$p\_WK + 2 * \frac{T}{T\_dr}(D*T\_dr - D\_dr*T)*\dot{p}\_WK$$

The regulator parameters T_dr and D_dr are here the time constant and the damping of the linear PT2 behavior which in principle can be arbitrarily preset as theoretic dynamics. In the practical design limits are set to high theoretic dynamics by a too strongly differentiating regulator character. This become important mainly in the above described structure of the matrix L o the observation unit. In this dorm the drafted pressure regulator works as model-supported feed-forward compensation of the non-linear pressure dynamics which replaces this by the desired behavior. The effectiveness of said step evidently depends decisively on the precision of the underlying model. In the practice has been found that modeling of the time behavior dependent on operating point is already enough to be able to achieve considerable performance gains compared to the non-compensated system.

The block pressure regulator is followed by a block "pressure-current conversion" which essentially consists of an inversion of the stationary pressure regulating line with an attached current regulation. The current regulation is here a standard regulation such as used in common pressure regulators. A modification is not needed, since the limiting frequency of the usual current regulation is clearly above that of the pressure regulator.

The last two blocks in the block diagram of the compensation pressure regulation control loop shown in FIG. 4 are the "signal preparation" and the "theoretic value generation". Both adequate supply the regulator with the needed information. The latter plays an important part chiefly in the "signal preparation". Besides an eventual filtration of strongly noisy signals, this block takes care that all information be available synchronized in time. The observation unit can specially behave sensitively to a blending of signals picked up synchronically relative to each other. This results, for ex., from the different CAN-bus running periods of individual signals and the preparation thereof. Individual signals (such as engine rotational speed) also cannot actually be made available in all operating states for each regulation cycle, since they are fed by an external control unit of the electronic transmission control. The invention proposes that the synchronization be carried out by delaying quick signals and extrapolating slow signals. Th e"theoretic value generation" makes available, together with the theoretic value w_d_soll for the rotational speed regulation of the clutch, the timed derivation thereof which is advantageous for a correct servo-control system. Said variables are determined, for ex., by using filters of second order which constantly differentiatably readjusting the actual variables by an ad3quate filter initialization.

The inventive model-based compensation pressure control loop with an observation unit of interference levels, which estimates from the drive train model the interference levels of the clutch regulation according to a state estimation method, can be universally used for every electrohydraulically controlled clutch. Other cases of application besides the regulation described in detail of a converter lock-up clutch are, for ex., a wet starting clutch in an automatic transmission or an automated manual transmission without or with stand coupling (stand by control, SBC), a shifting clutch or shifting brake in an automatic transmission. Compared to the control drafts known from the prior art, by an operating-point dependent, uniform regulation behavior of the closed control loop, essential advantages are obtained relative to sequential and interference behavior and dynamics. These are obtained by:

compensation pressure regulator to accelerate the servo component, substitution of an observation unit of interference level for the usual I regulator, improved servo-control (more accurate model).

The gain in performance capacity makes possible to a great extent to omit special functions, which makes easier both the manipulation and the structuration o the software. The model-based control draft makes possible the use of physically interpretable parameters. This considerably simplifies the [German word "Portierbarkeit" forth coming] and application.

| References | |
|---|---|
| WK | converter lock-up clutch |
| WKV | converter clutch valve |
| p_WK | converter clutch pressure |
| p_HD | system pressure |
| DRV | constant pressure regulating valve |
| EDS | electrohydraulic pressure regulator |
| i_EDS | current |
| Q_WK | WK through flow |
| c_hydr | hydraulic elasticity |
| M_mot | engine torque |
| J_mot | inertia torque of engine and primary side of converter |
| M_WK | torque on the converter lock-up clutch |
| J_G | gear-dependent substitute inertia torque of transmission and drive train |
| M_L | load torque of tractional resistance |
| M_K | torque on a shifting clutch |
| d | torsional vibration-damping constant of the drive train |
| c | torsional vibration-spring rigidity of the drive train |
| J_F | gear-dependent inertia torque of the vehicle |
| M_r | output value of torques of the rotational speed regulator |
| M_vor | servo-control torque of the inverse system model |
| M_K | estimated clutch torque |
| k_L * M_L | portion of the load torque from kinematic coupling via the transmission wheel sets |
| J_d | inertia torque generating from the differential angular velocity of the clutch to be regulated |
| ω_mot | angular velocity of the engine |
| ω_t | angular velocity of the converter turbine |
| ω_d | differential angular velocity on the clutch to be regulated |
| ω_d_soll | estimated value of the differential angular velocity on the clutch to be regulated |
| p_nenn | pressure output value of the torque-pressure conversion |
| p_soll | pressure output value of the pressure regulator |
| A | system matrix of the differential equalization of a reduced observation unit |
| B | adjusting matrix of the differential equalization of a reduced observation unit |
| T | time constant |
| D | damping constant |

What is claimed is:

1. A method for regulating an electrohydraulically controlled clutch and brake with a control system for a clutch or brake of a transmission, the method comprising the steps of:

regulating the clutch or brake using a model-based compensation pressure regulator with the aid of an observation unit;

providing an electronic control loop of said compensation pressure regulator containing a non-linear compensation value which corresponds to an inverse model of the control system for the clutch or brake; and estimating using said observation unit, interference levels of the clutch regulation on the basis of a drive train model according to a condition-estimation procedure.

2. The method according to claim 1, further comprising the step of using said observation unit to estimate only the unknown system variables relevant for the clutch regulation.

3. The method according to claim 1, further comprising the step of using said observation unit to estimate all system variables relevant for the clutch regulation.

4. The method according to claim 1, further comprising the step of designing said observation unit as Kalman filter.

5. The method according to claim 1, wherein said compensation pressure control loop contains a regulator which from measured signals, theoretical standards of the measured signals, calculated values of the inverse system model of the clutch or brake and from at least one estimated value of the observation unit, determines an operating-point independent regulated quantity.

6. The method according to claim 1, wherein the compensation pressure control loop contains a regulator which from measured signals, theoretical standards of the measured signals and from at least one estimated value of the observation unit, forms a regulated quantity independent of the tolerance of an electrohydraulic servo component through which the clutch of brake is hydraulically controlled.

7. The method according to claim 1, wherein said compensation pressure control loop contains a regulator which from a calculated pressure standard for an electrohydraulic servo component through which the clutch or brake is hydraulically controlled and from at least one estimated value of the observation unit, determines a regulated quantity independent of the tolerance of the electrohydraulic servo component.

8. The method according to claim 1, comprising the step of using the compensation pressure control loop contains several linked regulation blocks wherein a first regulator block (rotational speed regulator) to process measured rotational speeds and rotation speed estimated values or the equivalent signals thereof ($\omega\_t, \omega\_mot, \omega\_d, \omega\_d\_soll$) and forming, using a second consecutive regulator block (torque-pressure conversion) from the theoretical standard ($M\_r$) of the first regulator block, from servo-control vales ($M\_vor$) of the inverse system model ($M\_S, J\_d/J\_G^*$ ($M\_K-k\_L^*M\_L$)) of said observation unit, an operating-point independent regulated quantity ($p\_nenn$), and forming, using a third consecutive regulator block (pressure regulator) from the theoretic standard ($p\_nenn$) of said second regulator block and from the estimated interference levels ($p\_WK$) of said observation unit, a regulated quantity ($p\_soll$) independent of the tolerance of the electrohydraulic pressure adjuster and forming, using a fourth consecutive regulator block (pressure-current conversion) forms from the theoretic standard ($p\_soll$) of said third regulation block a current standard ($i\_EDS$) with which the electrohydraulic pressure adjuster is loaded.

9. The method according to claim 8, further comprising the step of designing said first regulator block (rotational speed regulator) as a P regulator.

10. The method according to claim 8, further comprising the step of designing said first regulator block (rotational speed regulator) as PD regulator with added non-linear term.

11. The method according to claim 8, wherein said third regulator block (pressure regulator) is designed as regulator with PT2 characteristic according to the principle of exact linearization.

12. The method according to claim 1, wherein a timed derivation of theoretical values of the rotational speed of the clutch regulation or equivalent variables thereof are processed in the inverse model of the control system.

13. A method for regulating an electrohydraulically controlled clutch and brake with a control system for a clutch or brake of a transmission, the method comprising the steps of:

regulating the clutch or brake using a model-based compensation pressure regulator with the aid of an observation unit;

providing an electronic control loop of said compensation pressure regulator containing a non-linear compensation signal which corresponds to an inverse model of the control system for the clutch or brake;

estimating using said observation unit interference levels of the clutch regulation on the basis of a drive train model according to a condition-estimation procedure; and providing in said electronic control loop a controller that generates a working point independent control variable on the basis of measured signals, setpoint assignments of the measured signals, calculated values of the inverse model of the control system of the clutch or brake, ad at least one estimated value of the observation unit.

* * * * *